United States Patent [19]

Dackus

[11] Patent Number: 4,930,547
[45] Date of Patent: Jun. 5, 1990

[54] POWDER-FILLED WELDED STEEL TUBE AND METHOD FOR THE CONTINUOUS MANUFACTURE THEREOF

[75] Inventor: Arnold J. G. Dackus, Arnhem, Netherlands

[73] Assignee: Rijnstaal B.V., Arnhem, Netherlands

[21] Appl. No.: 348,087

[22] Filed: May 4, 1989

Related U.S. Application Data

[63] Continuation-in-part of Ser. No. 122,689, Nov. 19, 1987, abandoned.

[30] Foreign Application Priority Data

Nov. 28, 1986 [NL] Netherlands .......................... 8603032

[51] Int. Cl.$^5$ ............................................. F16L 9/04
[52] U.S. Cl. .................................. 138/171; 138/128; 138/103; 138/118; 138/177; 138/178; 219/145.22
[58] Field of Search ............... 138/103, 128, 170, 171, 138/177, 178, 118; 72/367, 377, 378; 228/155, 156, 157, 158, 144, 150, 151, 149, 136, 137, 138; 219/145.22

[56] References Cited

U.S. PATENT DOCUMENTS

| 6,834 | 1/1876 | Rohrmon ........................... 138/171 |
| 1,629,748 | 5/1927 | Stoody ............................ 219/145.22 |
| 2,055,771 | 9/1986 | McLaughlin ........................ 72/368 |
| 2,077,454 | 4/1937 | Almdale ........................... 138/171 |
| 3,036,205 | 5/1962 | Aida et al. ....................... 219/145.22 |
| 3,296,414 | 1/1967 | Holloway et al. ............... 219/145.22 |
| 3,334,975 | 8/1967 | Quaas et al. ....................... 219/145.22 |
| 3,542,998 | 11/1970 | De Huff .......................... 219/145.22 |
| 3,545,496 | 12/1970 | Wogerbauer ....................... 138/171 |
| 4,048,705 | 9/1977 | Blanpain et al. ................ 219/145.22 |
| 4,086,463 | 4/1978 | Omori et al. ..................... 219/145.22 |

FOREIGN PATENT DOCUMENTS 0003370 8/1979 European Pat. Off. .
19230 of 1891 United Kingdom ................ 138/171

*Primary Examiner*—James E. Bryant, III
*Attorney, Agent, or Firm*—Stevens, Davis, Miller & Mosher

[57] ABSTRACT

A powder-filled welded steel tube has a tube wall with a welded longitudinal seam and is wound into a coil for despatch. To reduce the risk that the seam opens when the tube is twisted, e.g. on uncoiling, the tube wall is provided with a continuous longitudinal groove. Preferably the groove is symmetrical and directed radially inwards. In the continuous manufacture of such tube, a metal strip is formed into an open channel, powder is introduced into the channel, the channel is closed and the edges welded to form a closed tube. The diameter is then reduced and the finished product is coiled. The longitudinal groove is rolled in continuously during the diameter reduction of the powder-filled welded tube.

1 Claim, 2 Drawing Sheets

POWDER-FILLED WELDED STEEL TUBE AND METHOD FOR THE CONTINUOUS MANUFACTURE THEREOF

This application is a Continuation-in-Part of application Ser. No. 122,689, filed Nov. 19, 1987 now abandoned.

BACKGROUND OF THE INVENTION

1. FIELD OF THE INVENTION

The invention relates to a powder-filled steel tube in coiled form, having a tube wall with a welded longitudinal seam and which is wound into a coil and to a method of continuous manufacture of such a tube.

2. DESCRIPTION OF THE PRIOR ART

European patent publication 0003370 illustrates a tube of the kind described above and a method of its manufacture. This product can be used in steel making for alloying liquid steel or for adding oxidizing agents into a steel ladle. It is therefore known as "ladle wire". This ladle wire, with a typical diameter of 5 to 18 mm, is injected vertically into the liquid steel bath at a speed of between 1 to 10 meters per second.

At present this ladle wire is supplied in parallel wound coils. "Parallel wound" means a coil in which the different windings of wire are wound layer-wise next to each other and against each other. In order to uncoil the wire without twisting it, it is necessary to set up such a coil so that it revolves around its axis whereby the wire is pulled off from the coil by the injection device. However, some users find it troublesome to set up such a coil rotatably and they prefer to place the coil on the floor and draw off the wire end starting from the innermost layer. Clearly this means that the wire becomes twisted.

In practice, this twisting can impose so much stress on the seam of the welded steel tube that the ladle wire ruptures at the seam and part of the powder spills out.

SUMMARY OF THE INVENTION

The object of the invention is to improve a powder filled welded steel tube so as to prevent or minimize the danger of untimely rupture of the seam resulting from twisting.

The coiled tube according to the invention is characterized in that the tube wall is provided with a continuous longitudinal groove of depth greater than the wall thickness.

This groove thus has an open mouth at the tube circumference and is directed inwardly therefrom. The groove preferably has a depth less than the radius of the tube.

This longitudinal groove provides the advantage that it absorbs torsional stresses, so that the seam is protected.

Preferably, as seen in transverse cross section of the tube, the longitudinal groove is symmetrical and directed radially inwards.

The invention also provides a method for the continuous manufacture of a powder-filled welded steel tube, in which (i) a metal strip is formed into an open channel, (ii) powder is introduced into the channel, (iii) the channel is closed to form a tube with a longitudinal joint by bringing together the edges of the strip, (iv) the longitudinal joint is welded into a seam to form a closed tube, (v) the diameter of the tube is reduced in at least one reduction stage, and (vi) the tube is wound, e.g. on a reel, into a coil suitable for despatch, characterized in that a longitudinal groove is rolled continuously in the tube wall during the diameter reduction of the powder-filled welded tube, said groove having a depth greater than the final wall thickness.

In this method at the time of first rolling of the groove in the tube wall, preferably the tube has an outer diameter of about 16 mm and a wall thickness of about 0.4 mm and the groove created has a width of about 3 mm and a depth of about 3 mm. After further reduction, the tube can have an outer diameter of about 13 mm, preferably between 13 and 13.5 mm and the groove can have a width of about 1 mm and a depth of about 5 mm.

BRIEF INTRODUCTION OF THE DRAWINGS

A preferred embodiment of the invention is described below by way of non-limitative example with reference to the accompanying drawing, in which FIG. 1 is an enlarged cross-sectional view of the unfinished powder filled tube of the invention, FIG. 2 shows, also enlarged, the final cross-section of the finished powder-filled tube and FIG. 3 shows a coil of powder-filled tube.

DESCRIPTION OF THE PREFERRED EMBODIMENT

Figure 1:
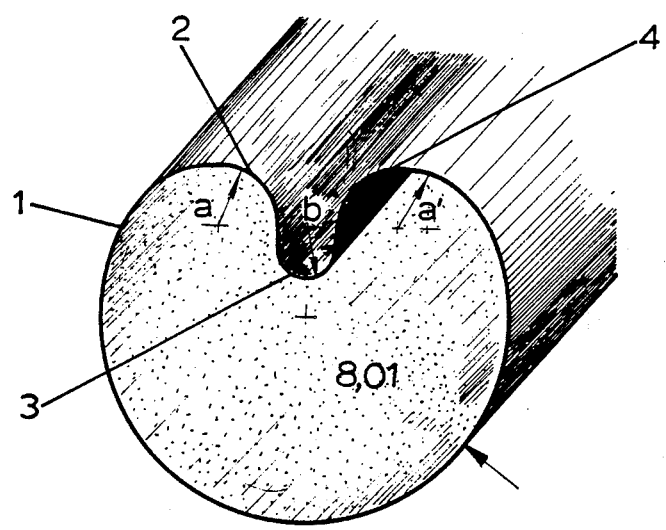

In FIG. 1 there is shown a powder-filled welded steel tube at an intermediate stage when the tube wall 1 has a thickness of about 0.4 mm. The outer diameter of the powder-filled welded steel tube is 16.02 mm at this stage. Of course the numerical dimensions given here are not limitative. During the formation of this tube, after welding of the seam, by rolling-in, a continuous longitudinal groove 3, symmetrical in cross-section and directed radially inwards, is produced in the tube wall 1. This longitudinal groove 3 has a base of radius of curvature 1.5 mm and so has an internal width of $2 \times 1.5$ mm = 3.0 mm and by means of curved surfaces 2 and 4 smoothly passes into the cylindrical tube wall 1 with an external curvature radius a and $a^1$ of 1.8 mm. The depth of the groove is therefore $1.8 + 1.5 = 3.3$ mm.

This tube is formed from a metal strip which is shaped into a channel. Powder is introduced into the channel and the strip edges brought together and sealingly welded to produce a longitudinal seam. Diameter reduction, using reducing rolls, follows. The groove 3 is formed during this diameter reduction.

Figure 2:
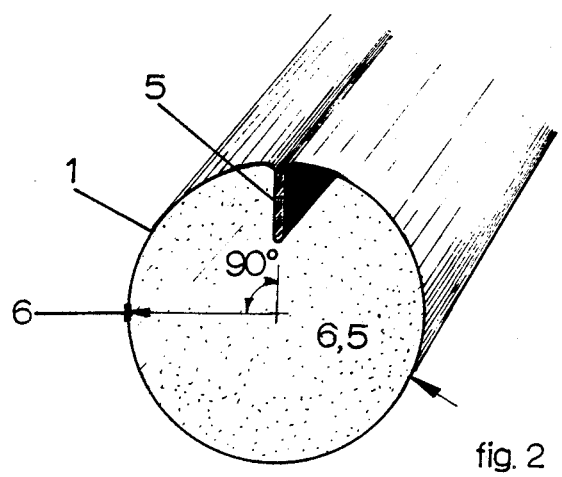

When the tube shown in FIG. 1 is further reduced in diameter (by rolling or drawing), the groove 3 which has been rolled in becomes narrower and deeper, and finally reaches the shape 5 shown in FIG. 2. This groove 5 is about 5 mm deep and about 1 mm wide. The tube diameter has become about 13 mm. The tube is then coiled, e.g. on a reel.

Preferably the groove 5 is produced at an angular distance of 90° from the welded seam 6, shown in FIG. 2. This 90° angle occurs as a result of a convenient arrangement of the rolls during reducing, assuming that a symmetrical rolled section is to be maintained. However, it is possible that, if the quality of the welded seam 6 is excellent, the longitudinal groove can equally well coincide with this welded seam.

When, especially when manufacturing thin-walled tube, this tube is filled with powder for obtaining so-called filled tube (such as is intended as wire or filled ladle wire), it is important that the welded seam produced should not rupture on further processing such as diameter reduction or coiling.

If the tube according to FIG. 1 is filled with a powder of a density $\rho$ which is still to be compacted, then, on reducing the diameter from $d_1$ to $d_2$, because of folding in the rolled-in groove, the final density $\rho_2$ of this powder will increase more than in inverse ratio to the diameter, in the ideal case of no reduction in circumference at all roughly according to the relationship:

$$\rho_2 = \frac{d_1^2}{d_2^2} \cdot \rho_1$$

This means that the increase in length of the tube at this reduction of the diameter can, in principle, be nil, and that in order to achieve a particular powder density, it is only necessary to reduce the diameter less.

The torsional stiffness of the wire-shaped tube according to FIG. 2 is significantly less compared to a wire of corresponding outer diameter, which means that less stress in the welded seam occurs on twisting, so that the chance of rupture of this seam 6 on later use is markedly less.

Figure 3:
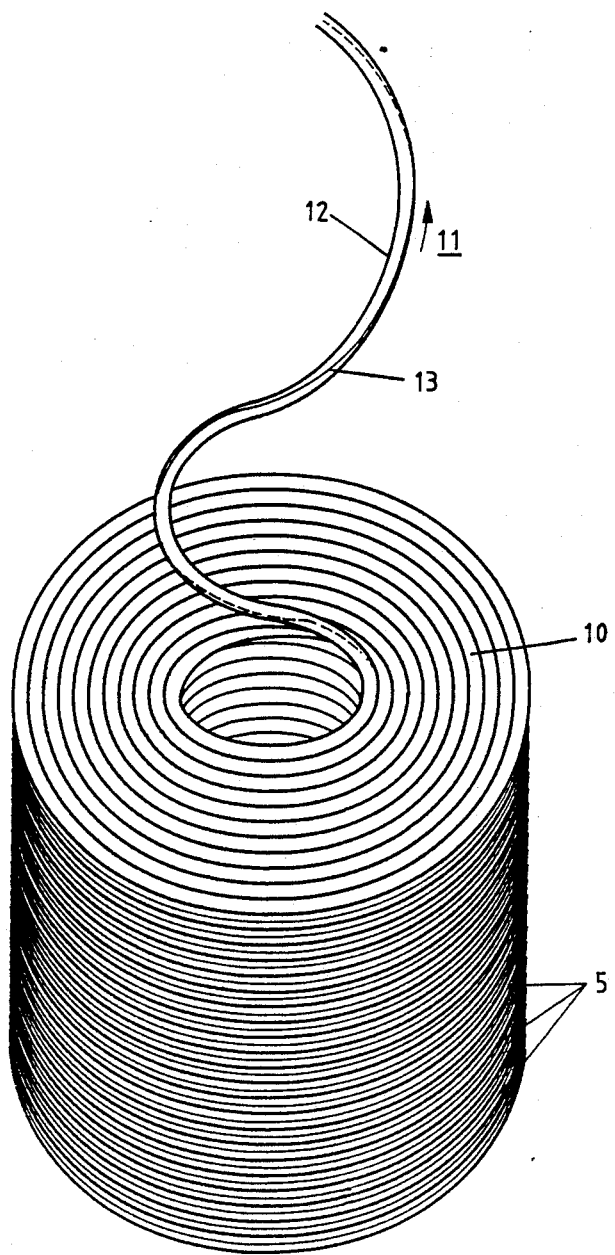

In FIG. 3 reference number 10 indicates in general a view of a coil of powder-filled tube according to the invention. The coil comprises a number of parallel windings which windings are wound layer-wise next to each other and against each other. The coil has no core and is therefore called a "free coil". Typically, a still wound coil has an outer diameter of 1400 mm, an inner diameter of 500 mm and a height of 800 mm. The tube typically has a diameter of 13 mm. In the figure the groove in the wound tube is indicated by reference number 5.

While being unwound the coil is standing steadily on a floor as a so-called "steady coil". In the figure the coil is being unwound starting from the innermost layer by pulling the tube in the direction of the arrow 11. Pulling can be performed in a known manner by a feeding apparatus that feeds the tube into a metallurgical vessel in the case of the ladle wire. Reference number 12 shows the unwound tube, over which the groove 5 is now running spirally due to the twisting of the tube. In the prior art, where there is no groove, the occurring torsional stresses are absorbed by the tube wall. In the tube according to the invention, torsional stresses are essentially absorbed by the groove, thereby relieving the welded seam, and preventing the seam from opening untimely.

What is claimed is:

1. A free steady coil of coiled powder-filled welded steel tubing to be uncoiled while standing in a free steady state, said tubing having in cross-section a radius and a wall thickness, said tubing being uncoilable with twisting along the axis of said free steady coil thereby imposing torsional stress on the tube, said tubing having a tube wall with a welded longitudinal closed seam and powder enclosing within the tube wall and a continuous longitudinal radial groove in the tube wall of depth greater than the thickness of the tube wall but less than said radius in cross-section of said tube, said groove defining a means for absorbing torsional stresses during uncoiling and preventing seam rupture.

* * * * *